United States Patent [19]

Mann

[11] Patent Number: 4,527,381
[45] Date of Patent: Jul. 9, 1985

[54] LATERAL FLOTATION MECHANISM FOR COMBINE HARVESTERS

[75] Inventor: Harry F. Mann, Hampton, Australia

[73] Assignee: Sperry Corporation, New Holland, Pa.

[21] Appl. No.: 541,759

[22] Filed: Oct. 13, 1983

[51] Int. Cl.³ .............................................. A01D 67/00
[52] U.S. Cl. ....................................... 56/209; 56/16.2
[58] Field of Search ................................. 56/209, 16.2

[56] References Cited

U.S. PATENT DOCUMENTS

| | | | |
|---|---|---|---|
| 2,800,760 | 7/1957 | Heth | 56/209 |
| 2,872,200 | 2/1959 | Kroll | 56/209 |
| 2,947,134 | 8/1960 | Clifford et al. | 56/209 |
| 3,008,724 | 11/1961 | Lapins et al. | 56/209 |
| 3,065,590 | 11/1962 | Knollman | 56/209 |
| 3,408,798 | 11/1968 | Hale et al. | 56/209 |
| 3,474,607 | 10/1969 | Fairbank et al. | 56/209 |
| 4,253,295 | 3/1981 | Knepper | 56/209 |
| 4,416,109 | 11/1983 | Slazas | 56/209 |

*Primary Examiner*—Paul J. Hirsch
*Attorney, Agent, or Firm*—Larry W. Miller; Frank A. Seemar; Darrell F. Marquette

[57] ABSTRACT

A lateral flotation mechanism for the header on a combine harvester is disclosed wherein a pair of springs provide a counterbalancing force to stabilize the pivotal movement of the header about a centrally disposed pivot from externally imposed loads. After the external load is removed from the header, the springs effect a rotation of the header about the center pivot to return the header to a predetermined stabilized position. The compression of the springs is adjustable to pre-load the springs and compensate for any imbalance in the header.

10 Claims, 7 Drawing Figures

LATERAL FLOTATION MECHANISM FOR COMBINE HARVESTERS

BACKGROUND OF THE INVENTION

The present invention relates to harvester apparatus and in particular to a device which permits but controls relative movement between the cutting element or header and the associated combine harvesting unit from which the header is supported.

It is generally desirable for headers of combine harvesters to be able to have at least some movement capability relative to the remainder of the harvester unit; that is, it is desirable for the header to be able to rotate about a longitudinal axis whereby the lateral ends of the header may rise (or drop) in response to terrain variations over which the harvester passes. This motion will be herein termed as "lateral flotation". It is desirable to provide a harvester apparatus having a lateral flotation capability and also to provide means for controlling this lateral flotation movement.

Furthermore, it has been found that certain headers require considerable out-of-balance compensation. For example, the left side of crop harvesting headers, when viewed from the rear, is generally heavier than the right side. It would, therefore, be desirable to provide a means for compensating for this unbalanced weight distribution in combine headers in conjunction with the provision of a lateral flotation mechanism.

SUMMARY OF THE INVENTION

Accordingly, the present invention provides in harvester apparatus having a header for receiving and feeding crop material to a combine harvesting unit, the improvement including a header support unit, the improvement including a header support means comprising pivotal means for supporting said header for rotation about a substantially longitudinal axis relative to said combine harvesting unit, and means for applying a predetermined stabilizing moment in at least one direction about said longitudinal axis the arrangement being such that in the absence of any external load, said header is maintained in a stable predetermined relationship relative to the combine harvesting unit. Preferably equal and opposite predetermined stabilizing moments are applied to said header about the longitudinal axis.

In operation, in consequence of any external force, for example applied by variations in terrain, applied to the header causing a turning moment about the longitudinal axis exceeding the stabilizing moment applied by the support means about the same axis, will cause the header to rotate in the direction of the applied moment. Once the displacing turning moment ceases to act on the header or is sufficiently reduced in magnitude, the support means returns the header to its original predetermined relationship with the combine harvester unit.

There is also provided, according to the present invention, in a harvester apparatus having open type header for receiving and feeding crop material to a combine harvesting unit, the improvement including a header support means comprising pivotal means for supporting said header for rotation about a substantially longitudinal axis relative to said combine harvesting unit, and hydraulic means for applying a predetermined stabilizing moment in at least one direction about said longitudinal axis, said hydraulic means being under at least the partial influence of the weight of said header, the arrangement being such that the header attitude is automatically stabilized under varying conditions presented during travel over rough and undulating terrain.

Conveniently, the hydraulic stabilizing means can be hydraulically interconnected to a hydraulic ram or rams supporting said header to utilize the hydraulic pressure in said ram or rams.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
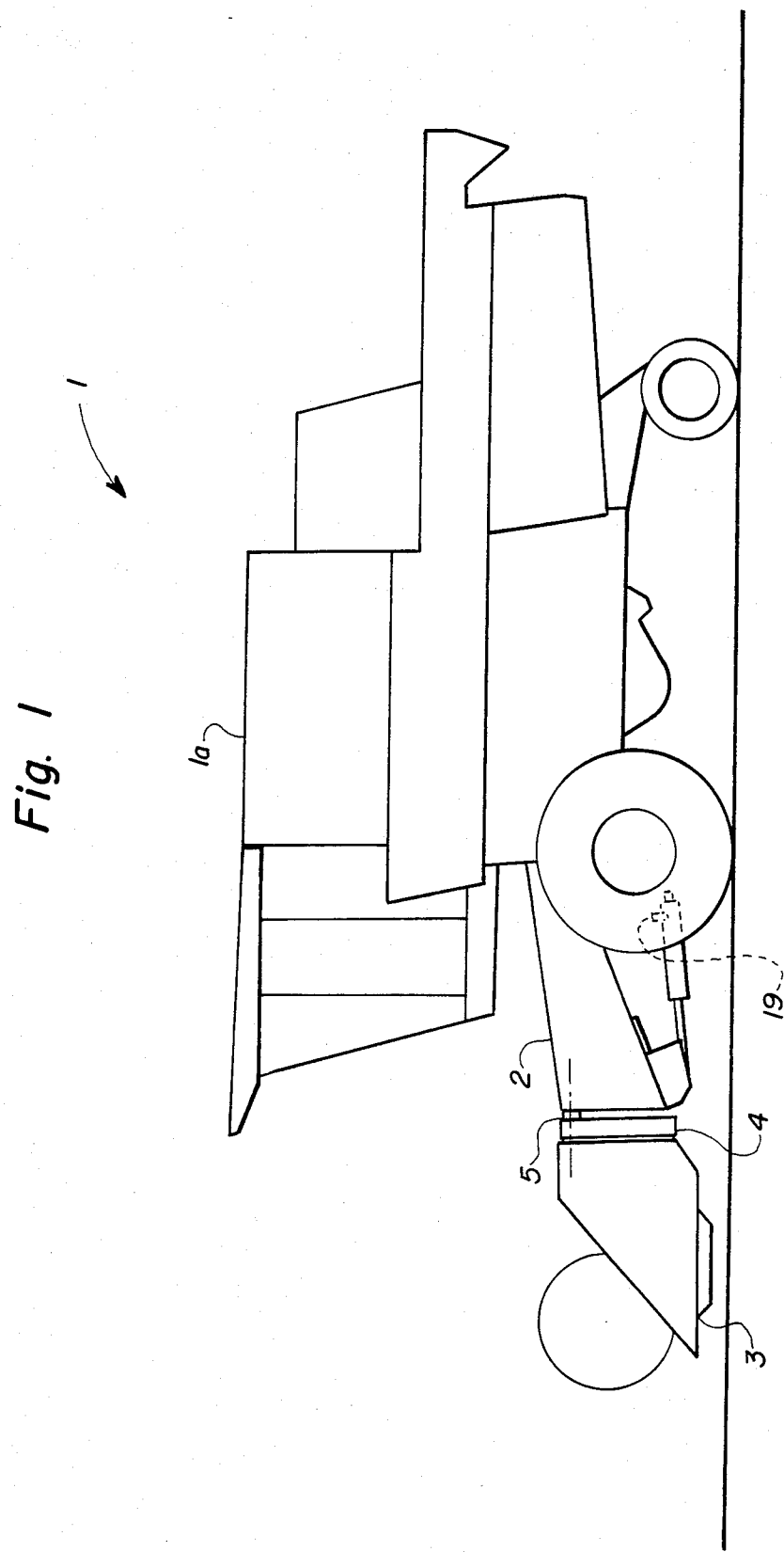
FIG. 1 is a schematic side elevation view of a header and combine harvesting unit.

Referring now to the drawings and particularly to FIG. 1, a schematic side elevational view of a combine incorporating the principles of the instant invention can be seen. Any left and right references are used as a matter of convenience and are determined by standing at the rear of the machine, facing the forward end, the direction of travel. The combine includes a base harvesting unit 1a fitted with a feeder housing 2 which supports the cutting element or header 3. The header 3 is rigidly attached to a frame 4 which is free to rotate on a longitudinal axis or pivot pin 5 which is preferably rigidly attached to the feeder housing 2.

Figure 2:
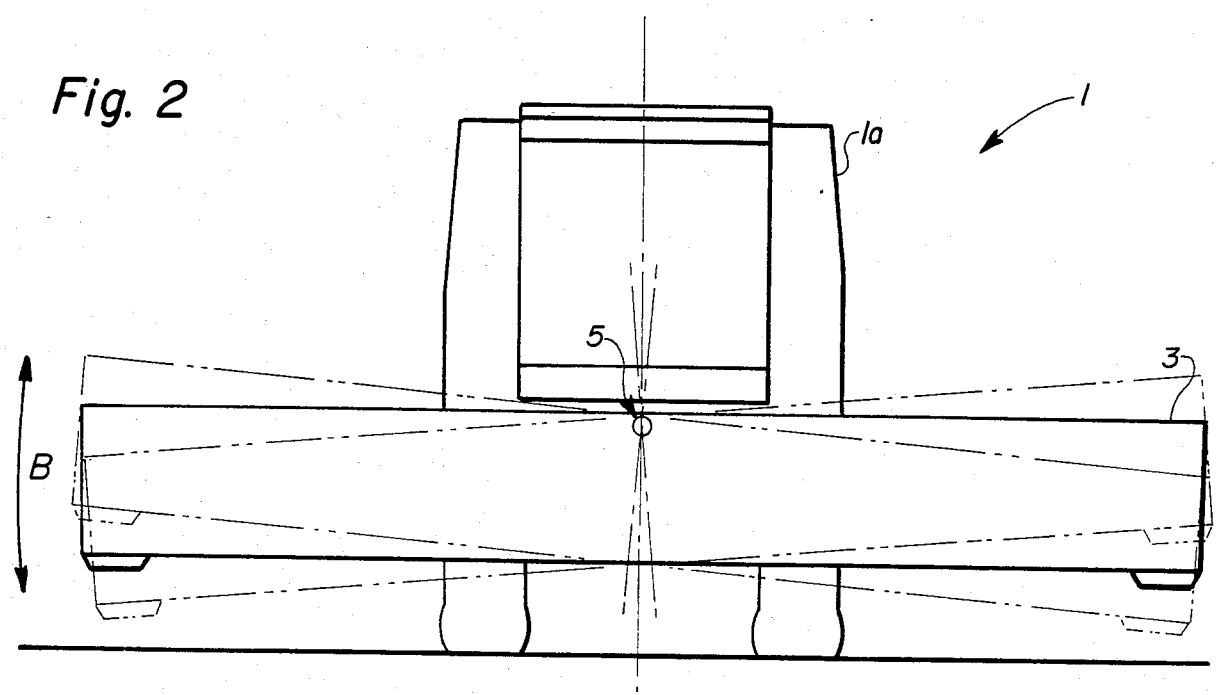
FIG. 2 is a schematic front elevation view of the header and combine harvesting unit of FIG. 1, with the lateral floating movement of the header being shown in phantom.

Thus mounted, the header 3 is free to rotate as shown in FIG. 2, providing the lateral flotation previously described as shown by arrow B. That is the lateral outer ends of the header 3 can rise or drop in response to terrain variations.

Figure 3:
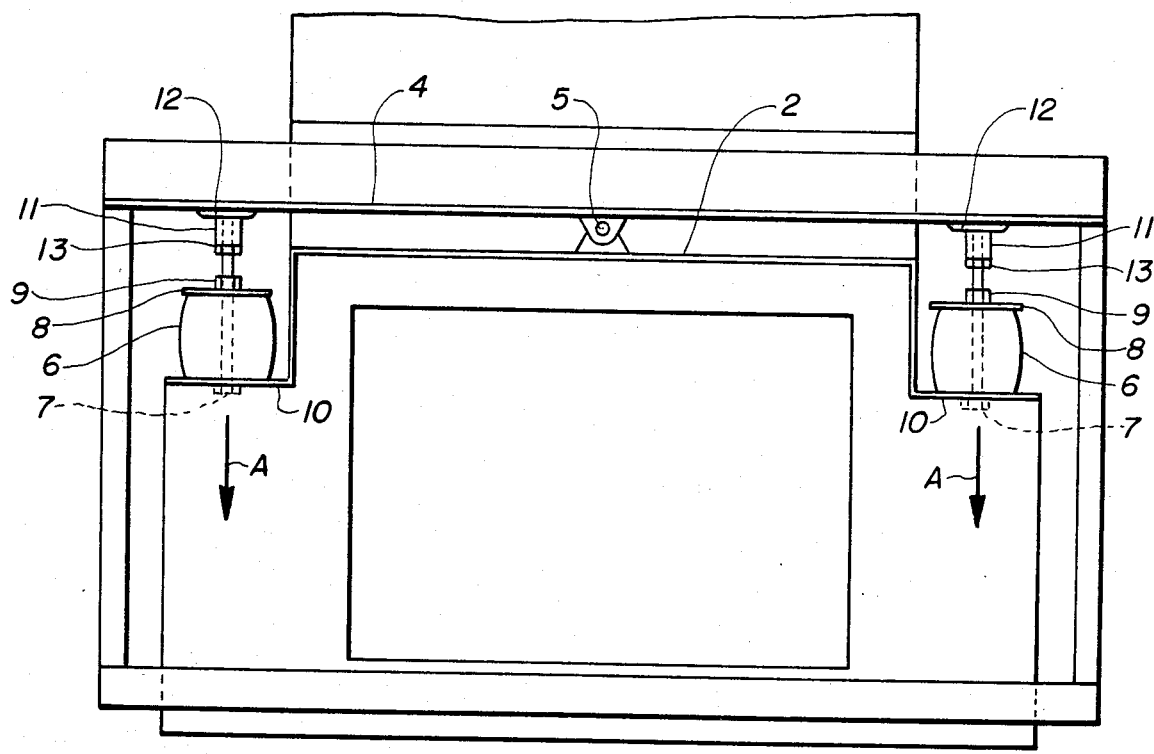
FIG. 3 is an enlarged partial front elevational view of the pivoting cradle assembly attached to the feederhouse, showing schematically one possible embodiment of the header support means, with the header removed.

FIG. 3 shows in detail one preferred method of lateral flotation control viewed from the front with the header removed for greater clarity. The cradle frame 4 is mounted on the feeder housing 2 and is free to pivot about the pivot pin 5 within predetermined limits. A more detailed description of this pivotable cradle assembly 4 can be found in U.S. Pat. No. 4,253,295, granted to Larimer J. Knepper on Mar. 3, 1981, the description of which is incorporated herein by reference. Rigidly mounted on the feeder housing 2 are two compression springs 6 which may be helical coil springs or any other substitute such as resilient material blocks or the like. Bolts 7 carry spring seats 8 retained by nuts 9. The heads of the bolts 7 abut the upper side of feeder house spring support 10 and are free to move in an upward direction indicated by arrow A. The lower ends of the bolts 7 carry adjustable screw pads 11 which are adapted to engage against the top side of thrust blocks 12 attached rigidly to the cradle 4.

By adjustment of the nuts 9, the compression of springs 6 can be varied to give the required amount of pre-load on the bolts 7 and may be so adjusted to partially compensate for any out of balance in the header itself. Having determined the required pre-loads, screw pads 11 are adjusted to give the required alignment between frame 4 and the feeder housing 2. The pads 11 are then locked with the locknuts 13 to maintain light contact with the thrust blocks 12.

Figure 4:
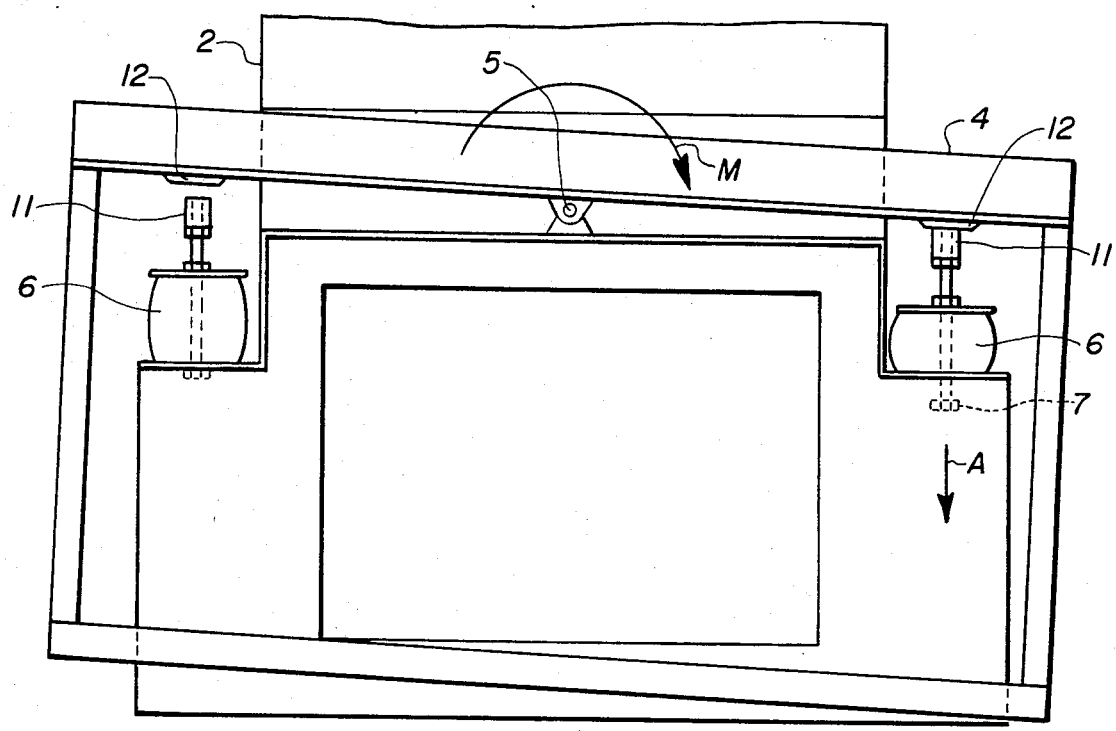
FIG. 4 is a view similar to FIG. 3 showing the result of an externally applied upward moment to the right side of the header.

With the above structure, the predetermined stable relationship as previously described can be achieved. If a turning moment 'M' (FIG. 4) of sufficient magnitude is applied by the header to the cradle frame 4, the pre-load on the left hand (as viewed in the drawing) spring 6 is exceeded and the bolt 7 is forced downwards in the direction of arrow A and the frame 4 and the feeder house 2 assume the relationship shown in FIG. 4. Once the turning moment 'M' ceases to act or its magnitude is sufficiently reduced, the left hand spring 6 returns the frame 4 to its original setting, bringing the header and combine into their original relationship.

Figure 5:
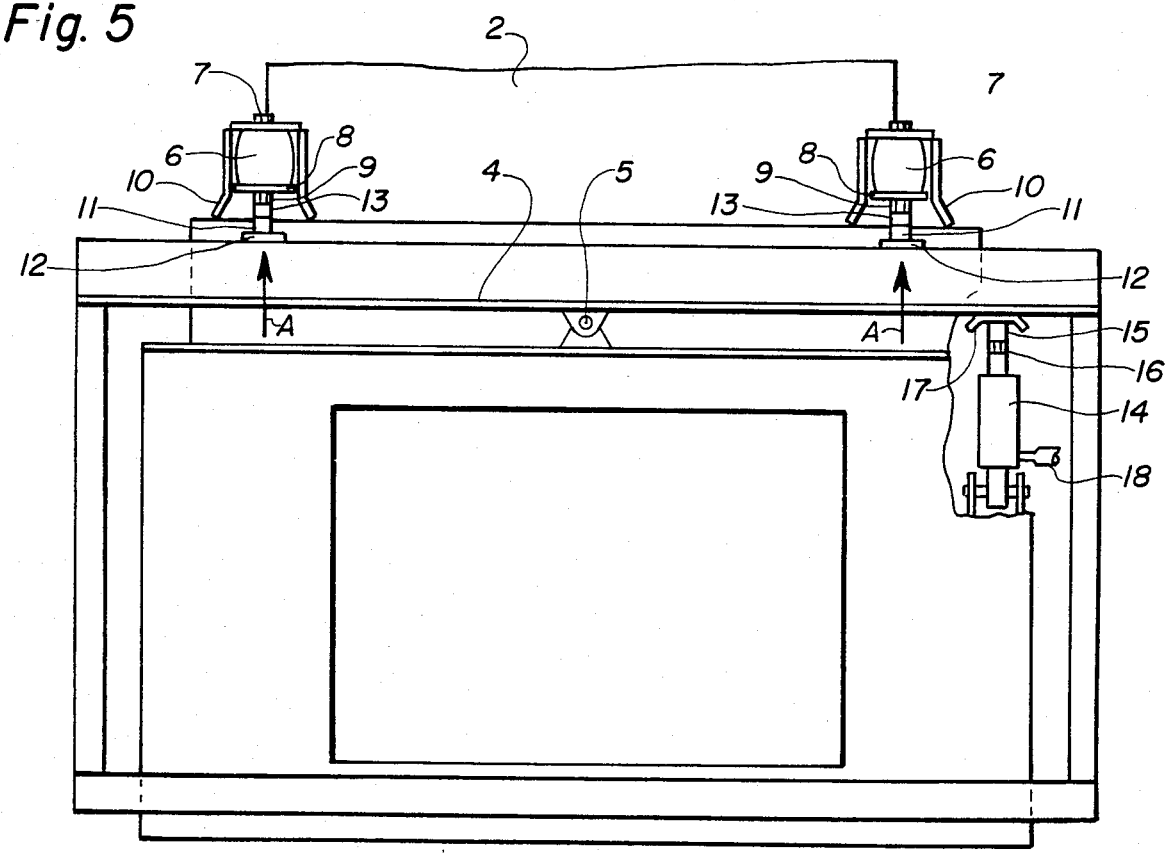
FIG. 5 is a view similar to FIG. 4 but showing a different embodiment of the instant invention.
Figure 6:
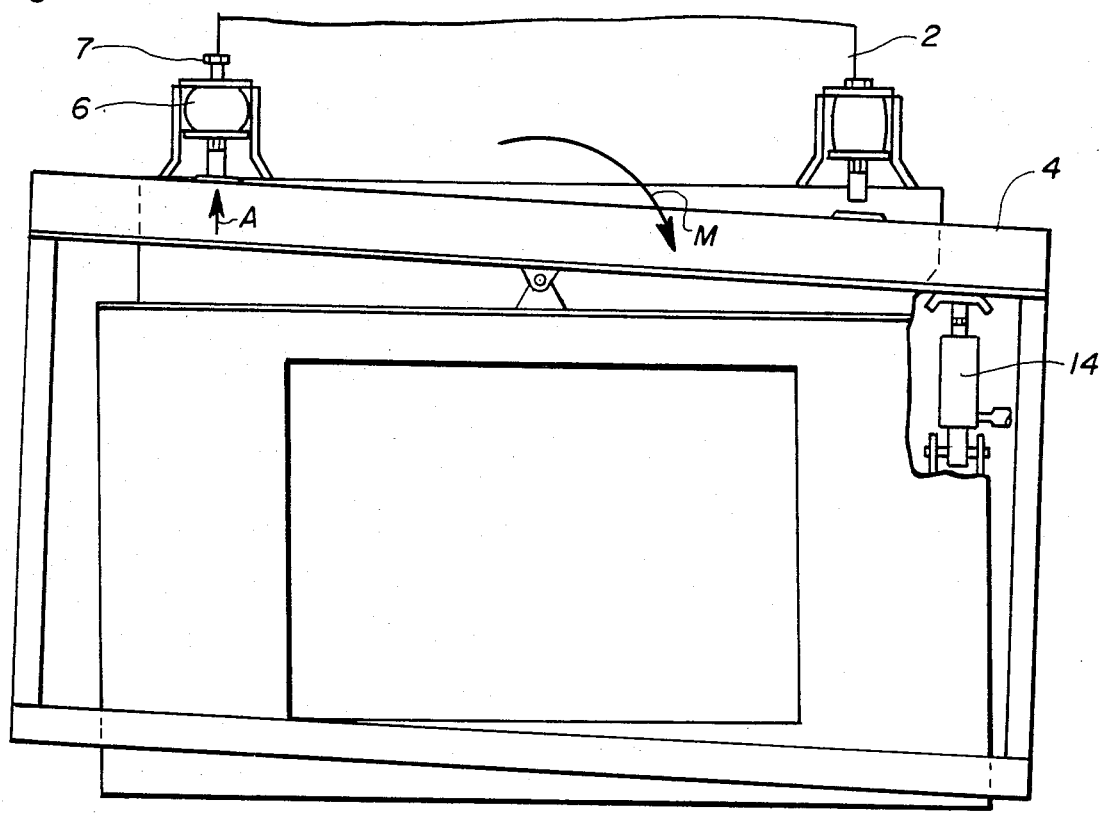
FIG. 6 is a view similar to FIG. 5 showing the result of an externally applied upward force to the right side of the header.
Figure 7:
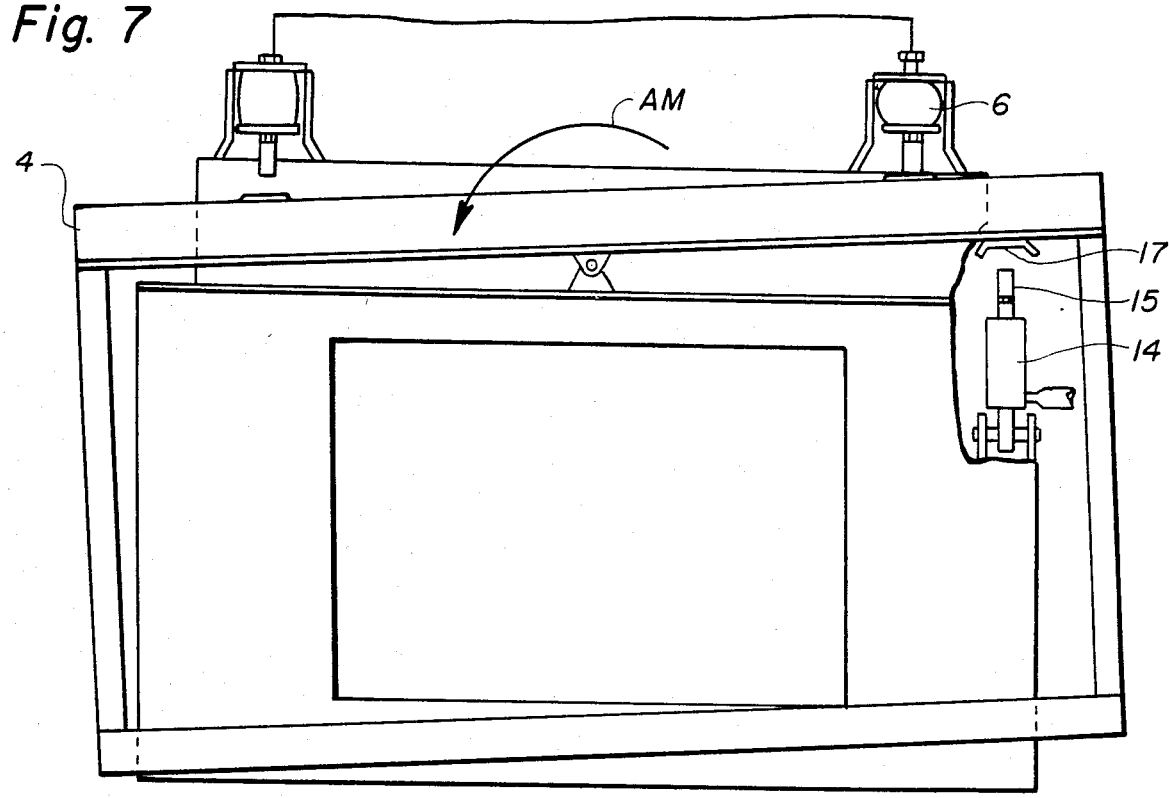
FIG. 7 is a view similar to FIG. 6 but showing the result of an externally applied upward force to the left side of the header.

An alternative embodiment providing additional stabilization can be seen in FIGS. 5-7. The header unbalance compensation mechanism can be a separate entity, providing a greater amount of compensation than provided for above, such as may be required for open-type headers.

On most headers, it is usual to find the left hand side to be the heavy side. For this reason, a hydraulic cylinder ram 14 of a certain open dimension is placed between cradle 4 and feeder 2. The ram 14 has an adjustable top pad 15 and locknut 16 in order to provide an adjustment for the initial locking of frame 4 relative to the ground. This top pad 15 nestles into a recessed pad 17 that provides stability for the ram when under load. The ram has a port 18 which is connected via a suitable hydraulic line to the header lift hydraulic power cylinder 19, seen in FIG. 1, in such a way that the ram 14 experiences the same pressures as does the header lift cylinder 19.

As best seen in FIG. 6, in the event of a turning moment 'M' producing a tilt of frame 4, the static force exerted by cylinder 14 is overcome and forces oil back from the cylinder into the lift cylinder circuit 19. The displaced oil initially is absorbed by conventional accumulators (not shown) that form part of the lift circuit to accommodate surges and fluctuations in hydraulic pressure. Subsequently, any slight increase in pressure caused by displaced oil is subsequently lowered by a miniscule rise in the height of the header as the lift rams extend slightly.

Should the combine encounter a series of furrows or an obstacle that causes the combine 1 to pitch in a fore-and-aft direction. This action in turn causes the header 3 to tend to accelerate up and down causing an increase and then a decrease in lift circuit pressure 19. Because of the lateral imbalance of header 3 this series of vertical accelerations would normally result in the header oscillating extensively. However, this system provides the header with a countertilt force that is a product of the instantaneous lift circuit pressure in cylinder 19. Thus an increase to moment 'M' caused by the bump or obstacle on the ground surface is counteracted by an increased countertilt provided by a higher cylinder force as a result of higher instantaneous lift circuit pressures. Alternatively, a negative vertical acceleration will result in a similar reduction of countertilt cylinder force by the same reasoning thereby providing the appropriate righting movement of the header during operation over rough ground.

FIG. 7 shows the system acting under the effect of a counterclockwise moment AM. In this situation the ram's cylinder rod pad 15 will lose contact with recessed pad 17. The returning movement in this case is provided by the imbalance of the header and also by the left hand spring 6 which is at this stage compressed and as a result compels the header to resume a normal attitude.

One skilled in the art will readily realize upon a reading of this disclosure that the lateral flotation control system can be designed as described above or can be fitted remotely and control achieved by any suitable mechanical, electrical, pneumatic or hydraulic system or combination thereof capable of meeting the above requirements. The control force used can be provided by any suitable metallic, elastomeric, hydraulic or pneumatic springing system.

Thus, the springs 6 may be substituted by adjustable pressure hydraulic or pneumatic buffers used alone or associated with mechanical spring means, the hydraulic and pneumatic pressure adjustments being capable of remote control if desired. The header out of balance compensation means can be an integral part of the lateral flotation springing system or may be fitted remotely as a separate entity.

It will be undertood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a harvester apparatus having a base harvesting unit, a header for receiving and feeding crop material to a combine harvesting unit, a feederhouse connected to said base harvesting unit and a header support means interconnecting said feederhouse and said header, including pivotal means for supporting said header for rotation about a substantially longitudinal axis relative to said combine harvesting unit, the improvement comprising:

means operably disposed between said feederhouse and said header for applying a predetermined stabilizing moment in at least one direction about said longitudinal axis, the arrangement being such that in the absence of any external load, said header is maintained in a stable predetermined relationship relative to the combine base harvesting unit with respect to pivotal movement about said longitudinal axis, said header being pivotable about said longitudinal axis upon an application thereto of an external force causing a turning moment greater than said stabilizing moment, said means for applying moment acting to return said header toward said predetermined relationship when said external force is lessened.

2. The harvester apparatus of claim 1 wherein said means for applying moment applies equal and opposite predetermined stabilizing moments to said header.

3. The harvesting apparatus of claim 2 wherein said means for applying said stabilizing moment include a pair of resilient members operatively disposed between said feederhouse and said header and corresponding abutment members engageable between lateral points of the header and said feederhouse such that an occurrence of said external load to said header results in a corresponding force applied to said resilient members.

4. The harvester apparatus of claim 3 wherein the resilient members are compression springs maintained under a predetermined compressive load when the harvester is at rest.

5. A combine for harvesting crop material from a field comprising:
   a base unit having threshing means housed therein for harvesting crop material;
   a feeder house forwardly connected to said base unit and having a conveyor mounted therein to convey crop material to said threshing means;
   a header supported by said feederhouse for collecting crop material from the field and discharging the collected crop material to said feeder house to be conveyed to said threshing means for further harvesting treatment;
   a cradle assembly interconnecting said feeder house and said header to support said header for lateral pivotal movement about a generally centrally disposed pivot axis; and
   resilient means disposed between said feeder house and said header to stabilize the pivotal movement of said header at a preselected position, said resilient means yielding upon application of an external force to said header to permit said header to pivotally move in response to said external force, said resilient means exerting a stabilizing force on said header to pivotally return said header to said preselected position after said external force has been removed.

6. The combine of claim 5 wherein said resilient means includes a spring laterally disposed on each side of said pivot axis.

7. The combine of claim 6 wherein said springs have adjustment means associated therewith to provide a variable amount of pre-load compression in said springs to compensate for any weight unbalance in said header.

8. The combine of claim 7 wherein each said adjustment means includes a spring seat carried by a bolt and retained by a nut, the selective positioning of said spring seat relative to the corresponding bolt causing a variation in the amount of pre-load given to the corresponding spring.

9. The combine of claim 8 further comprising a hydraulic cylinder connected to said feeder house and engageable with said cradle assembly to provide a mechanism for establishing said preselected position.

10. The combine of claim 9 wherein said hydraulic cylinder is retractable upon an exertion of an external force causing said header to pivotally move said cradle assembly against said hydraulic cylinder.

* * * * *